United States Patent [19]
Yamamura

[11] Patent Number: 6,009,117
[45] Date of Patent: Dec. 28, 1999

[54] SPREAD SPECTRUM COMMUNICATION SYSTEM

[75] Inventor: Hideya Yamamura, Aichi, Japan

[73] Assignee: Kabushiki Kaisha Toyoda Jidoshokki Seisakusho, Aichi-ken, Japan

[21] Appl. No.: 08/931,643

[22] Filed: Sep. 16, 1997

[30] Foreign Application Priority Data

Sep. 17, 1996 [JP] Japan .................................. 8-244418

[51] Int. Cl.⁶ .......................... H04B 15/00; H04K 1/00; H04L 27/30
[52] U.S. Cl. ............................. 375/206; 375/200
[58] Field of Search .................... 375/206, 200, 375/261, 262, 341, 298

[56] References Cited

U.S. PATENT DOCUMENTS 5,159,608  10/1992  Flconer et al. .......................... 375/1
5,204,874   4/1993  Falconer et al. ........................ 375/1
5,450,453   9/1995  Frank ...................................... 375/200
5,515,396   5/1996  Dalekotzin ............................. 375/206

Primary Examiner—Stephen Ohin
Assistant Examiner—Mohammad Ghayour
Attorney, Agent, or Firm—Morgan & Finnegan, L.L.P.

[57] ABSTRACT

A convolutional coding unit generates transmission data by performing an error correcting code process for sending data. A mapping unit arranges the transmission data at signal points corresponding to the data value. A PN sequence generating unit generates a PN sequence based on part of the transmission data. A spreading unit spreads a transmission signal by multiplying an output of the mapping unit by the PN sequence generated with the PN sequence generating unit. A despreading unit detects the PN sequence used on a transmitting side, and despreads the received signal by using the detected PN sequence. A remapping unit obtains the transmission data from the signal points at which the received signal is arranged. A supplementary information processing unit obtains supplementary information based on the detected PN sequence. A Viterbi decoding unit regenerates the sending data from the transmission data by using the supplementary information.

8 Claims, 16 Drawing Sheets

| INPUT 2 BITS | PN SEQUENCE |
|---|---|
| 0 0 | PN #1 |
| 0 1 | PN #2 |
| 1 0 | PN #3 |
| 1 1 | PN #4 |

FIG. 8

| FILTER NUMBER | OUTPUT 2 BITS |
|---|---|
| 1 | 00 |
| 2 | 01 |
| 3 | 10 |
| 4 | 11 |

FIG. 12A

| PN SEQUENCE | OUTPUT 2 BITS |
|---|---|
| PN #1 | 00 |
| PN #2 | 01 |
| PN #3 | 10 |
| PN #4 | 11 |

FIG. 12B

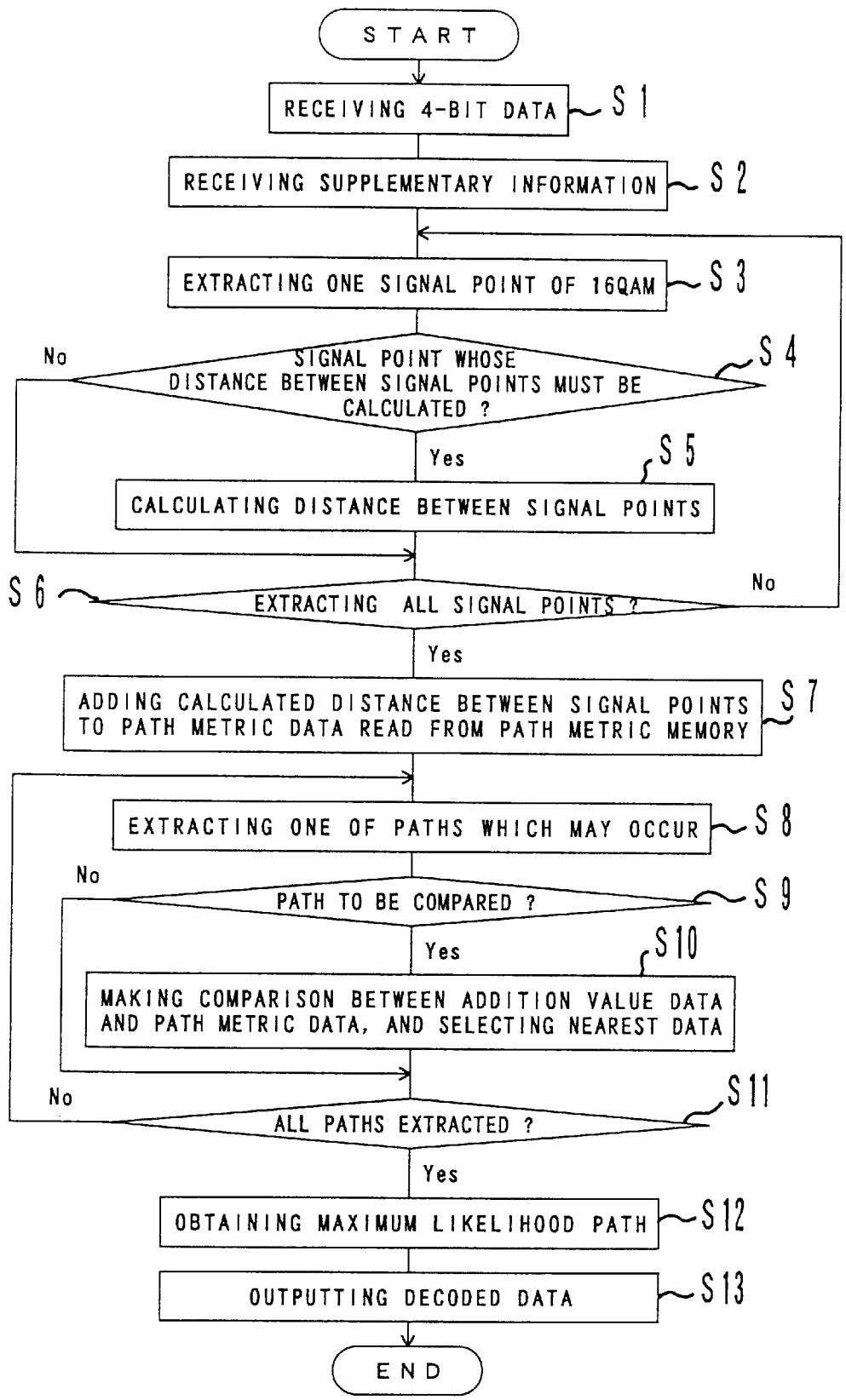
F I G. 1 5

SPREAD SPECTRUM COMMUNICATION SYSTEM

BACKGROUND OF THE INVENTION

1. Field of the Invention

The present invention relates to a spread spectrum communication system, and particularly relates to a spread spectrum communication system using an error correcting code.

2. Description of the Related Art

Since networking in offices, factories, etc. has rapidly become popular, not only the number of users to be connected to a network but also the amount of data to be transferred over the network has been increasing. Normally, an information transmission speed is improved to cope with the increase in the amount of data.

When information is transmitted, transmission data is normally modulated. That is, the data is modulated and transmitted on a transmitting side, and the modulated data is demodulated on a receiving side. As the modulation method, the PSK (Phase Shift Keying), the QAM (Quadrature Amplitude Modulation), etc. are known.

Provided hereinafter is the explanation about the technique for improving an information transmission speed by adopting a system using a spread spectrum communication system as a system for transmitting modulated data. As the spread spectrum communication, the DS (Direct Sequence) method, the FH (Frequency Hopping) method, etc. are known. Here, the DS method is to be described.

FIG. 1A is a schematic diagram showing the typical configuration of a spread spectrum communication system. This figure shows only baseband parts of the transmitting and receiving sides.

On the transmitting side, transmission data is information-modulated in a modulating unit 101. The modulation method to be used here is the PSK or the QAM, etc. A spreading unit 102 multiplies the information-modulated data with a PN (Pseudorandom Noise) code. Namely, the information-modulated data is further spread-modulated. The output of the spreading unit 102 is transmitted over a carrier wave.

On the receiving side, a despreading unit 111 multiplies the received signal whose frequency is converted into a baseband bandwidth with the same PN sequence as that used by the spreading unit 102. That is, the despreading unit 111 despreads (re-spreads) the received signal, and makes its state identical to that of the output signal of the modulating unit 101. The demodulating unit 112 demodulates the signal despread by the despreading unit 111, and regenerates the transmission data.

To improve the information transmission speed in the above described data transmission system, a multi-leveled number (the number of signal points) of information modulation is increased. If the number of signal points to be used for data transmission increases, the amount of data which can be transmitted in parallel increases. Therefore, the information transmission speed can be improved without changing the bandwidth of a transmission channel.

The method for improving the information transmission speed by increasing the multi-leveled number (the number of signal points) of the information modulation is applied not only to a system using a spread spectrum communication method, but also frequently applied to a normal data transmission.

If the multi-leveled number (the number of signal points) of the information modulation increases, the distance between each signal point becomes shorter as shown in FIGS. 2A through 2C. The distance between signal points plays a central role in determining the performance. As the distance becomes shorter, the error rate is reduced.

To prevent the error rate from being increased with an increase in the number of signal points, an S/N ratio must be improved. When a comparison between a 4PSK method and a 64QAM method is made, the S/N ratio must be improved by approximately 8 dB in order to attain the same error rate of $10^{-5}$ in a white Gaussian noise environment.

As the technique for improving the S/N ratio, the method using an error correcting code is known. The error correcting code is intended for adding redundancy to digital information in order to correct an error that has occurred in a communications channel when the digital information is transmitted. One example when an error correcting code circuit is simply added to the configuration shown in FIG. 1A is the configuration shown in FIG. 1B. In FIG. 1B, a convolutional coding unit 103 is arranged before the modulating unit 101 on the transmitting side, and a Viterbi decoding unit 113 is arranged after the demodulating unit 112 on the receiving side. With such a configuration, the error rate when data is transmitted can be improved, and the number of signal points can be increased to some extent, in comparison with the configuration shown in FIG. 1A. In this way, the information transmission speed can be improved.

However, if the error coding process is performed, the amount of data to be transmitted is normally increased by adding redundancy to sending data. Therefore, the data transmission rate must be raised in correspondence with that amount, so that the signal bandwidth becomes wider. Normally, the communications bandwidth of a radio communication is constrained. Using the error correcting code broadens the bandwidth, since the information amount to be transmitted is increased. However, a signal bandwidth is constrained. As a result, a spread gain (the ratio of a signal bandwidth before being spread to a communication bandwidth after being spread in the spread spectrum communication) may be constrained by broading of the signal bandwidth caused by the error correcting code.

FIG. 1C shows the configuration obtained by improving the configuration shown in FIG. 1B. In this configuration, a mapping unit 104 is arranged instead of the modulating unit 101, and a re-mapping unit 114 is arranged instead of the demodulating unit 112. The mapping unit 104 stores an input pattern and phase amplitude plane information used when a signal of that pattern is transmitted by determining a correspondence between them. It extracts the phase amplitude plane information by using the input signal (the output of the convolutional coding unit 103) as a key, and transmits the transmission data based on the phase amplitude plane information. The remapping unit 114 regenerates the transmission data by performing the process corresponding to that performed by the mapping unit 104, on the receiving side. This implementation may be sometimes called a coded modulation system.

With the coded modulation system shown in FIG. 1C, the error rate when data is transmitted can be improved without extending a signal bandwidth. However, considering a terrestrial channel environment in which multipath fading, etc. occurs, tolerance for the shortest distance between signal points cannot be said to be enough, and there is a limitation on improving the information transmission speed by increasing the number of signal points. Also, with the configuration shown in FIG. 1B, there is a limitation on improving the information transmission speed by increasing the number of signal points, considering a terrestrial channel environment in which multipath fading, etc. occurs.

SUMMARY OF THE INVENTION

An object of the present invention is to overcome the above described problems in a spread spectrum communication system, and to provide a system for allowing the number of signal points to be increased by improving an error rate when data is transmitted. Another object of the present invention is to simplify the process performed by a decoding device included in an error correcting code system.

The spread spectrum communication system according to the present invention is implemented by transmitting data of N bits by arranging the data at any of $2^N$ signal points.

On a transmitting side. the following units are arranged. An error correcting code unit generates N-bit transmission data by performing an error correcting code process for M-bit (M≦N) sending data. A spread sequence storing unit stores a plurality of spread sequences. An extracting unit extracts a spread sequence from the spread sequence storing unit based on at least part of the transmission data of N bits. A mapping unit arranges the transmission data of N bits at one of the $2^N$ signal points corresponding to the data contents. A spreading unit spreads the output of the mapping unit using the spread sequence extracted by the extracting unit. This spread signal is transmitted to a receiving side.

On the receiving side, the following units are arranged. A spread sequence detecting unit detects the spread sequence used by the spreading unit. A remapping unit performs a despreading process for the received signal by using the spread sequence detected by the spread sequence detecting unit, and generates N-bit data based on the despread result. A supplementary information processing unit obtains the at least part of the N-bit transmission data based on the spread sequence detected by the spread sequence detecting unit. An error correcting decode unit performs an error correcting decode process based on the N-bit data, which is generated by the remapping means, and at least the part of the transmission data of N bits, which is obtained by the supplementary information processing unit, and regenerates the M-bit sending data.

With the above described implementation, transmission data is spread by using a spread sequence corresponding to part of the transmission data on a transmitting side, and the spread sequence is detected on a receiving side, so that part of the transmission data is recognized on the receiving side. That is, the part of the transmission data is transmitted by using the spread sequence. Additionally, when the transmission data is arranged at one of the signal points and transmitted, part of the transmission data corresponding to the above described spread sequence is corresponded to the signal point used for the data transmission. When the coded transmission data is decoded on the receiving side, it is judged at which signal point the transmission data is arranged, and from which signal point the transmission data is transmitted, by using the part of the transmission data recognized on the receiving side. As described above, the process for detecting signal point at which transmission data is arranged by using part of the transmission data to be transmitted using a spread sequence, is enhanced.

BRIEF DESCRIPTION OF THE DRAWINGS

FIG. 8 exemplifies a PN storing unit;

FIGS. 12A and 12B exemplify the information stored by a supplementary information processing unit;

FIG. 15 is a flowchart explaining a Viterbi decoding process; and

DETAILED DESCRIPTION OF THE INVENTION

Figure 1A:
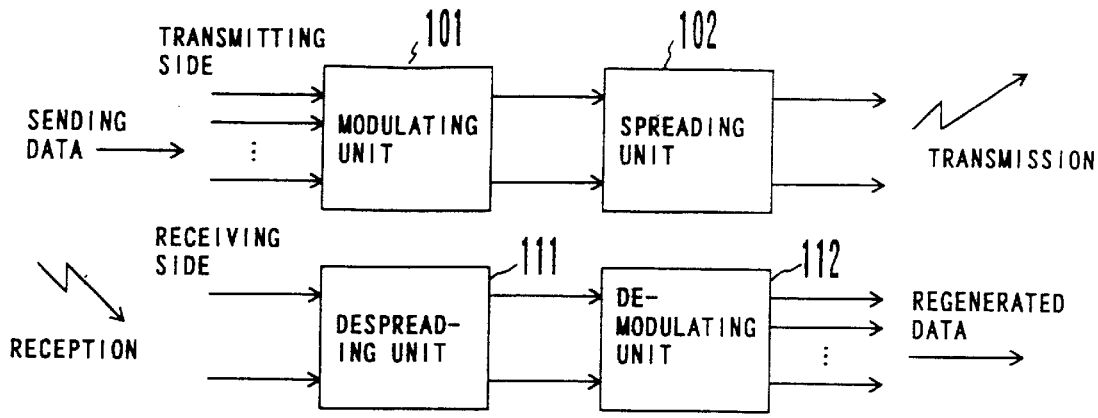
FIG. 1A is a block diagram showing the typical configuration of a spread spectrum communication system.
Figure 1B:
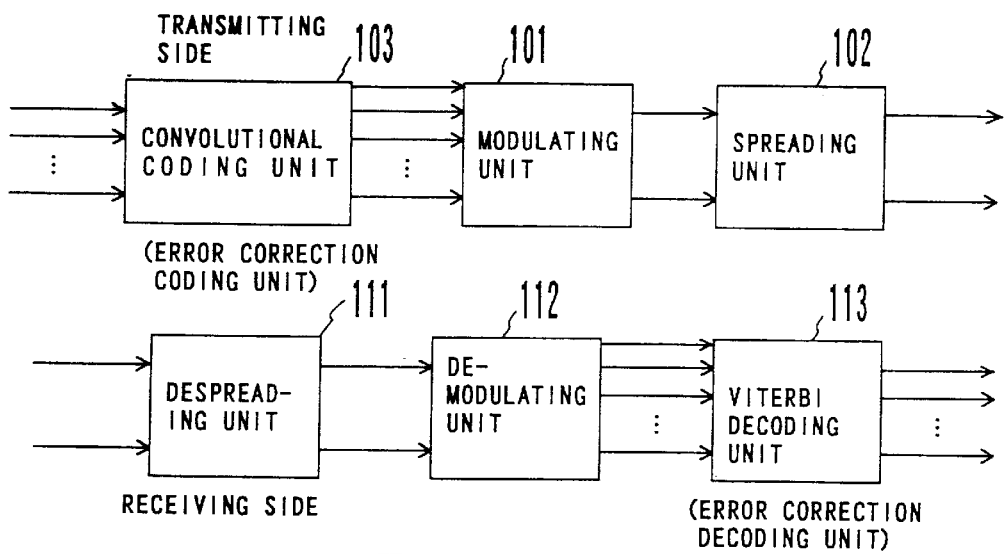
FIGS. 1B and C are block diagrams showing the configurations of a system in which an S/N ratio is improved with a conventional method.
Figure 1C:
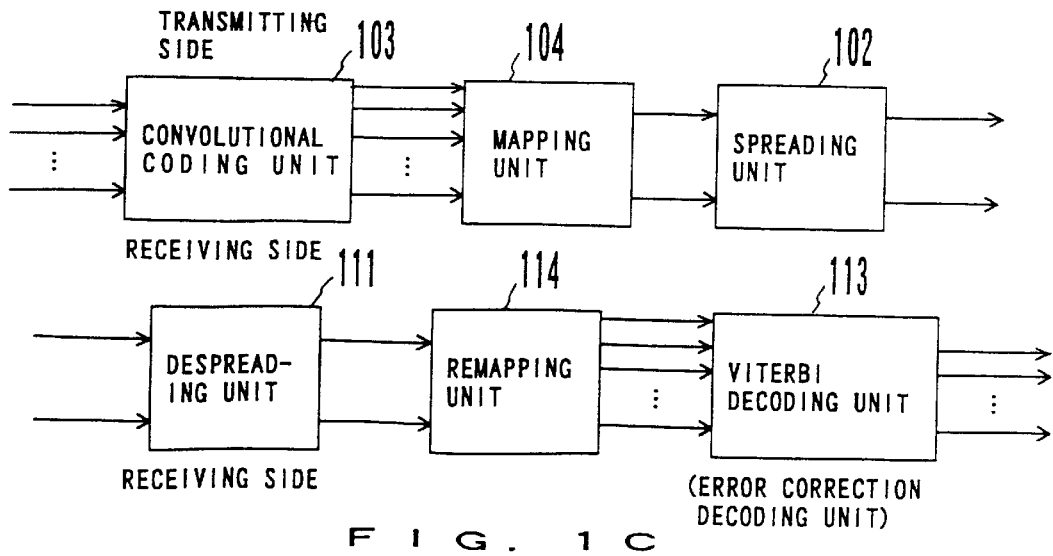
Figure 2A:
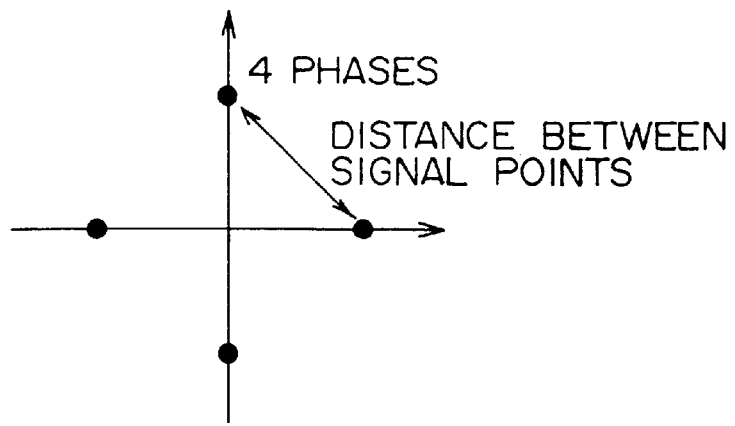
FIGS. 2A through 2C respectively exemplify the arrangements of signal points of a 4PSK, a 16PSK, and a 16QAM.
Figure 2B:
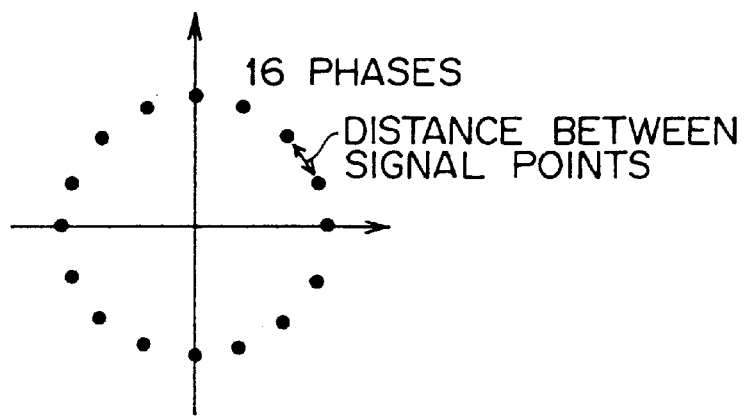
Figure 2C:
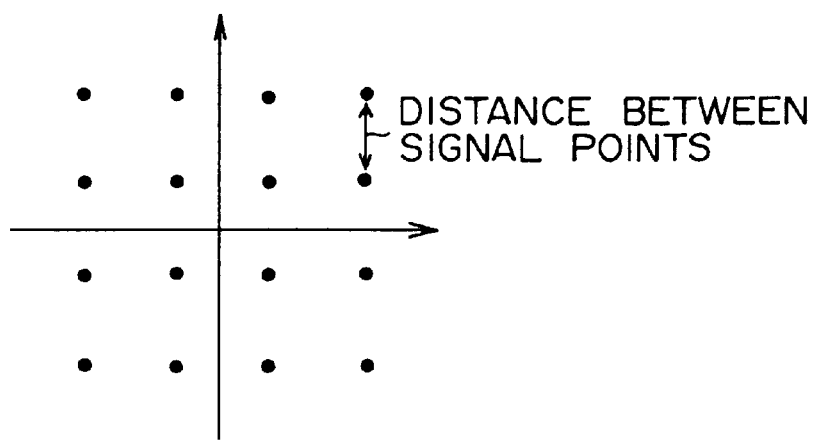
Figure 3:
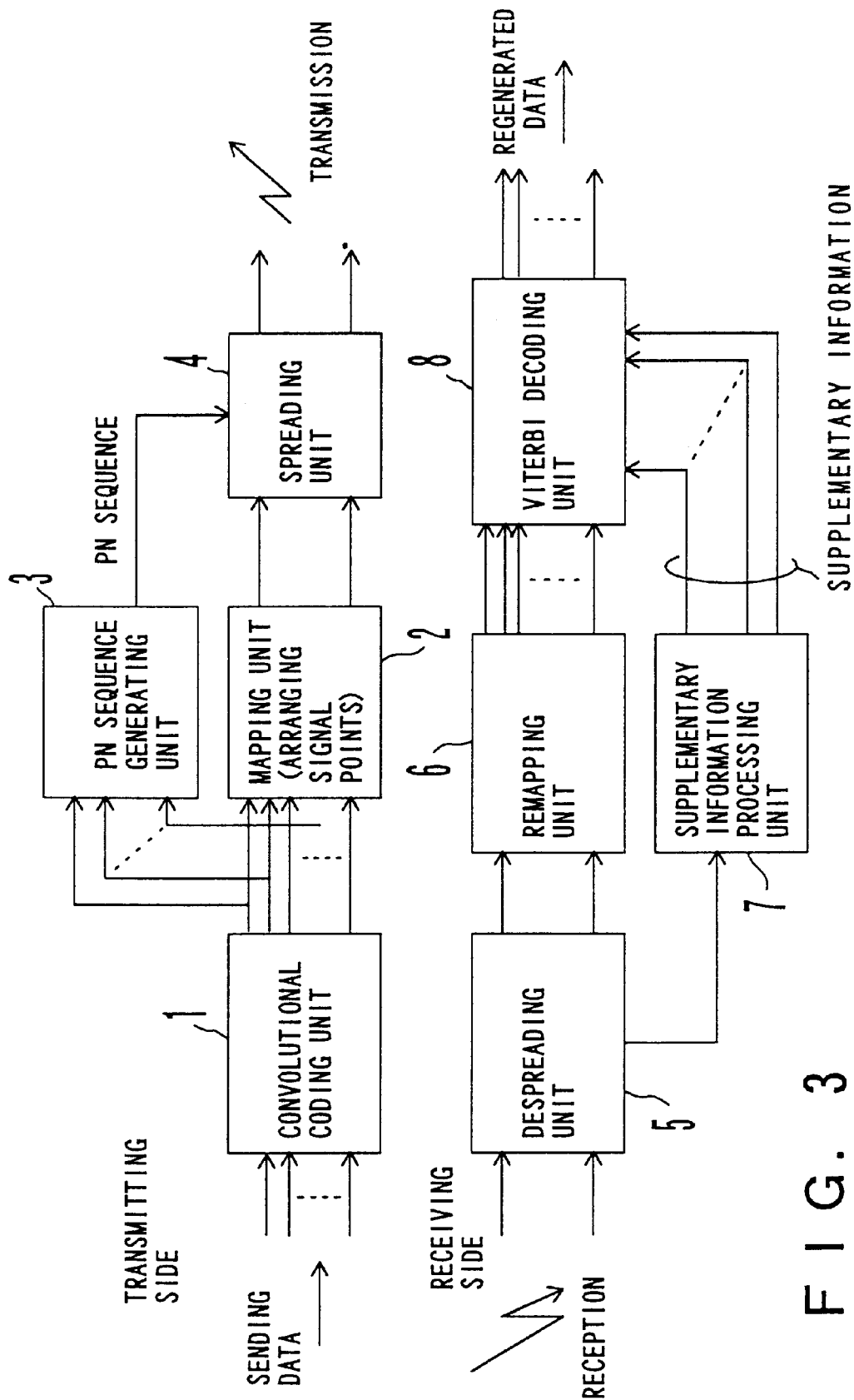
FIG. 3 is a block diagram explaining the basic configuration of a spread spectrum communication system according to a preferred embodiment.

FIG. 3 is a block diagram explaining the basic configuration of a spread spectrum communication system according to an embodiment of the present invention. This figure shows only the structure of a baseband part.

A convolutional coding unit 1 performs an error correcting code process for sending data. A mapping unit 2 arranges output data of the convolutional coding unit 1 at signal points corresponding to the output data. The output of the mapping unit 2 is the information indicating predetermined locations on a phase amplitude plane. It is composed of I phase data and Q phase data. A PN sequence generating unit 3 stores a plurality of types of PN sequences (spread sequences), selects one PN sequence based on part of the output of the convolutional coding unit 1, and provides the selected PN sequence to the spreading unit 4. The spreading unit 4 spreads a transmission signal by multiplying the output of the mapping unit 2 with the PN sequence provided by the PN sequence generating unit 3. The signal spread by the spreading unit 4 is transmitted over a carrier wave in a radio frequency bandwidth, although this is not shown in this figure.

On a receiving side, after the carrier wave component is removed, that is, after frequency conversion from the radio frequency bandwidth to the baseband bandwidth is performed, the received signal is input to a despreading unit 5. The despreading unit 5 detects the PN sequence used (selected) on the transmitting side, multiplies the received signal with the detected PN sequence, and transmits the despread signal to the remapping unit 6. The despread signal transmitted to the remapping unit 6 is data representing the signal points used for transmitting the data. The despreading unit 5 also passes the detected PN sequence (or the information for identifying the detected PN sequence) to a supplementary information processing unit 7.

The remapping unit 6 performs the reverse process to the process performed by the mapping unit 2. Namely, the mapping unit 2 obtains the signal points from the transmission data, while the remapping unit 6 obtains the transmission data from the signal points. The output of the remapping unit 6 is transmitted to a Viterbi decoding unit 8. The supplementary information processing unit 7 obtains supplementary information based on the information received from the despreading unit 5, and transmits the supplementary information to the Viterbi decoding unit 8. The Viterbi decoding unit 8 regenerates (decodes) the sending data by using the supplementary information.

Figure 4:
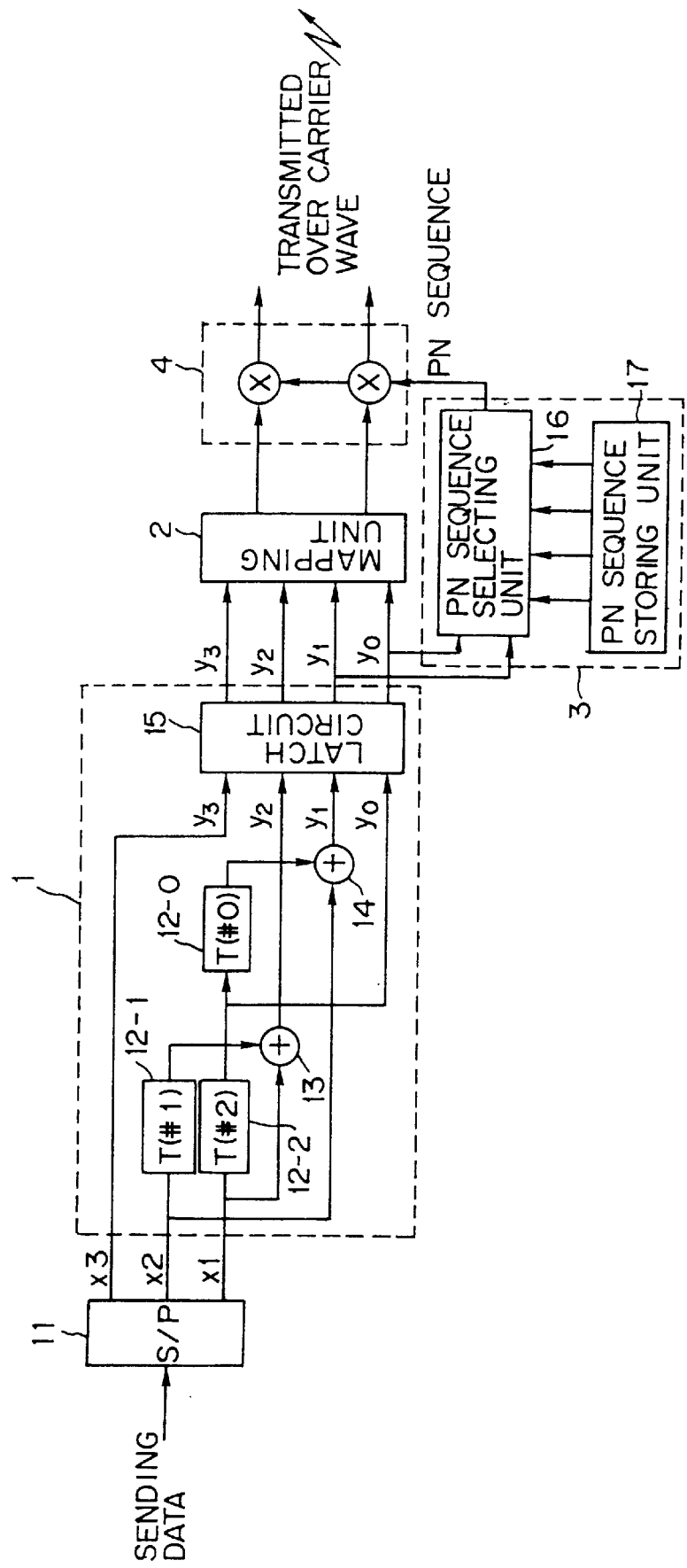
FIG. 4 is a block diagram showing the details of the configuration on a transmitting side, which is shown in FIG. 3.

FIG. 4 is a block diagram showing the details of the configuration on a transmitting side, which is shown in FIG. 3. In the following embodiment, serial sending data is converted into 3-bit parallel data, and transmitted.

A serial/parallel converting circuit 11 converts the serial sending data into 3-bit parallel data. A convolutional coding unit 1 comprises registers 12-0, 12-1, 12-2, logical OR circuits 13 and 14, and a latch circuit 15. It outputs 4-bit parallel data (y0, y1, y2, y3) by adding a redundancy to the 3-bit parallel transmission data (x1, x2, x3) received from the serial/parallel converting circuit 11. As the coding method used by the convolutional coding unit 1, for example, the method proposed by Ungerboeck is adopted.

Figure 5:
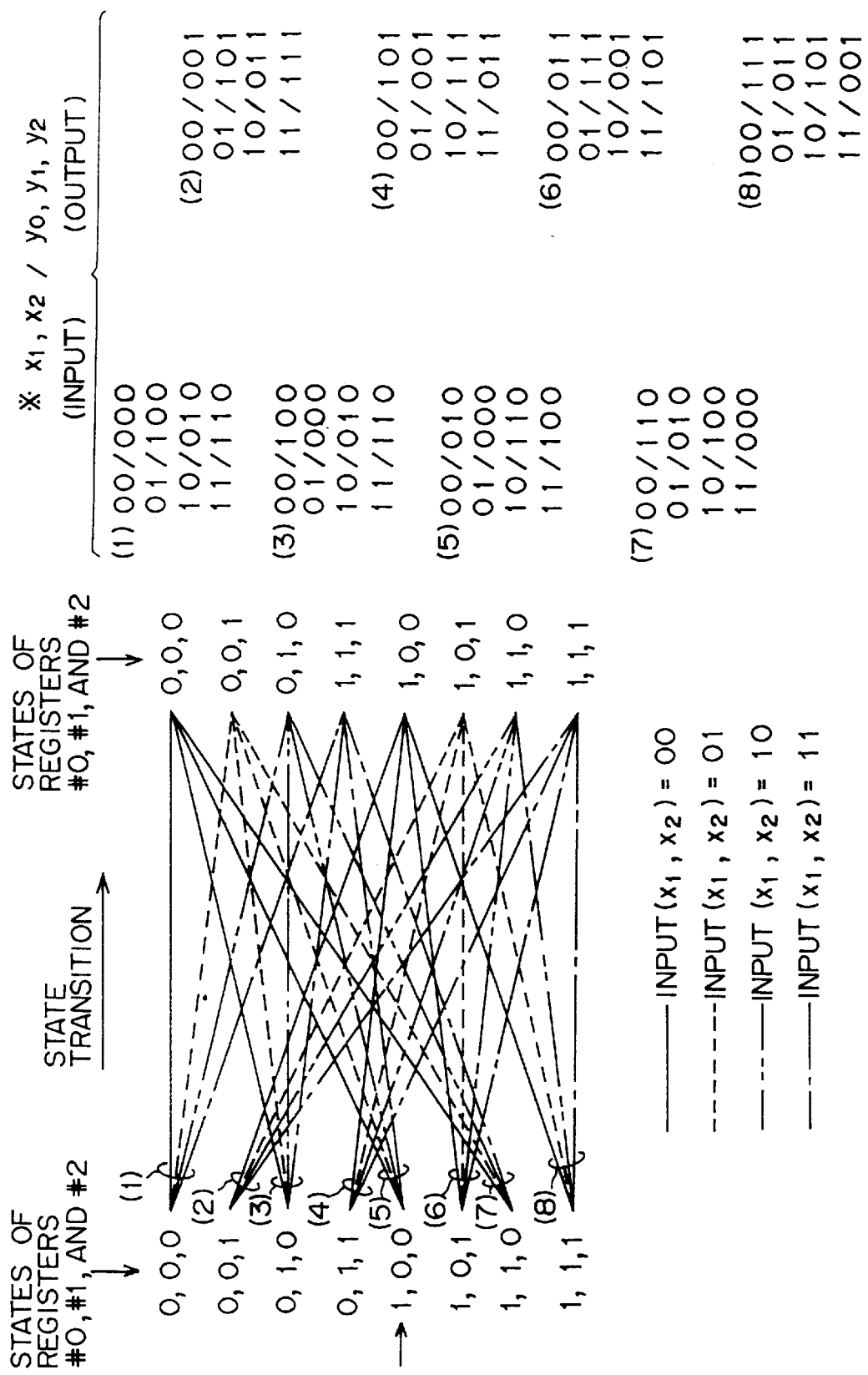
FIG. 5 is a trellis diagram showing an input/output relation of a convolutional coding unit and a transition state of each of registers.

FIG. 5 is a trellis diagram showing the input/output relation of the convolutional coding unit 1 and the transition states of the registers 12-0, 12-1, and 12-2.

Three numerals shown in the vertical columns on the left and right sides of the trellis diagram respectively indicate the states of the registers 12-0, 12-1, and 12-2 (the values stored by the registers). For example, "0, 0, 0" indicate that all of the registers 12-0, 12-1, and 12-2 have the value "0". Furthermore, this trellis diagram includes four types of lines. The lines; solid, dashed, line-double-dashed, and line-single-dashed, respectively indicate the transitions when the respective inputs ("x1" is defined to be the bit on the left side, and "x2" is defined to be the bit on the right side) are "00", "01", "10", and "11".

Each of numbers (1) through (8) appearing on the right side of FIG. 5 indicates the input/output relation of the convolutional coding unit 1 for each state of the registers 12-0, 12-1, and 12-2. Here, two numerals on the left of a slash indicate input values (the left bit indicates "x1" and the right bit indicates "x2"), while 3 numerals on the right of the slash indicate output values (the left bit indicates "y0", the middle bit indicates "y1", and the right bit indicates "y2").

Assume that the states of the registers 12-0, 12-1, and 12-2 are respectively "1", "0", and "0", and the data input to the convolutional coding unit 1 is (x1, x2, x3)=(1, 0, 1). The states of the registers 12-0, 12-1, and 12-2 respectively make a transition to "0", "1", and "0". As a result, (y0, y1, y2, y3)=(1, 1, 0, 1) is obtained as the output data.

The data (y0, y1, y2, y3) for which the error correcting code (convolutional coding) process is performed is output to the mapping unit 2 at a predetermined timing after it is latched by the latch circuit 15.

Figures 6A, 6B:
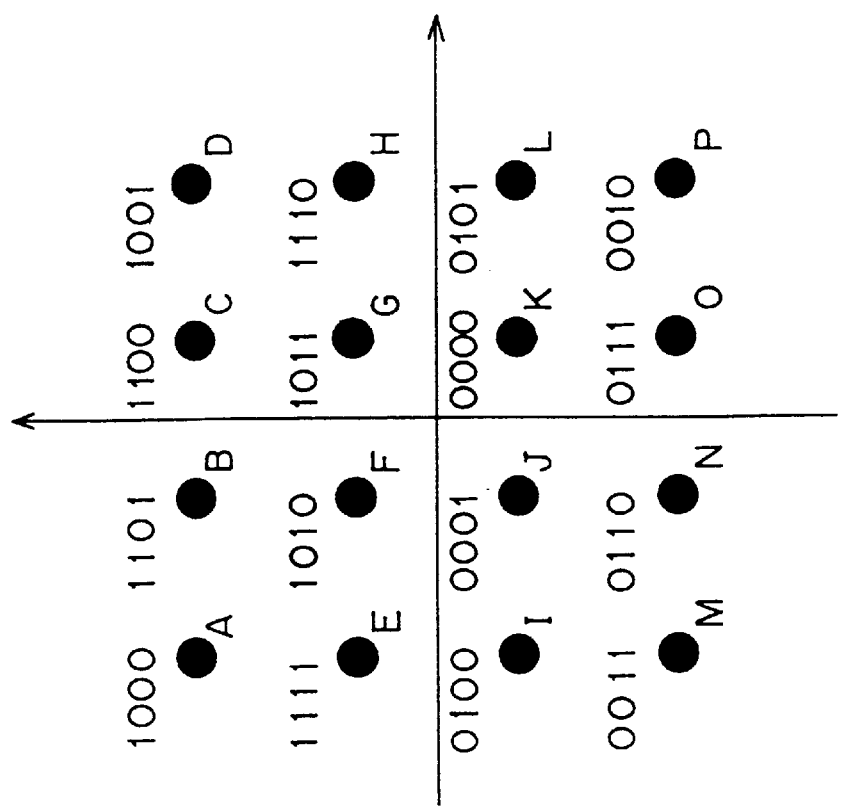
FIGS. 6A and 6B are schematic diagrams showing the arrangements of signal points in a mapping unit.

FIG. 6A is a schematic diagram showing the arrangement of signal points in the mapping unit 2. This figure represents a phase space (phase amplitude plane), and illustrates the signal points arranged with the 16QAM method. Each of the signal points is defined by the amplitude and phase in the phase space. For the sake of convenience, the respective signal points are referred to as signal points A through P. Additionally, in the 4-bit data assigned to the respective signal points shown in this figure, the leftmost bit corresponds to "y3", and the rightmost bit corresponds to "y0". For example, (y3, y2, y1, y0)=(1, 0, 0, 0) is assigned to the signal point "A".

The correspondence between the transmission data (y3, y2, y1, y0) for which the convolutional coding process is performed and the signal points is stored in a memory such as a ROM, etc. FIG. 6B exemplifies the structure of the memory storing the information about the arrangement of signal points. As shown in this figure, the amplitude and phase of each of the signal points "A" through "P" in the phase space can be searched using each of key addresses 0000 through 1111. For example, if the mapping unit 2 receives (y3, y2, y1, y0)=(0, 0, 0, 0) as the output data from the convolutional coding unit 1, it extracts the amplitude information and the phase information of the signal point "K" from the memory, and arranges those data at the signal point "K". Namely, the data (y3, y2, y1, y0)=(0, 0, 0, 0) is transmitted with the amplitude and the phase stipulated at the signal point K.

Figure 7:
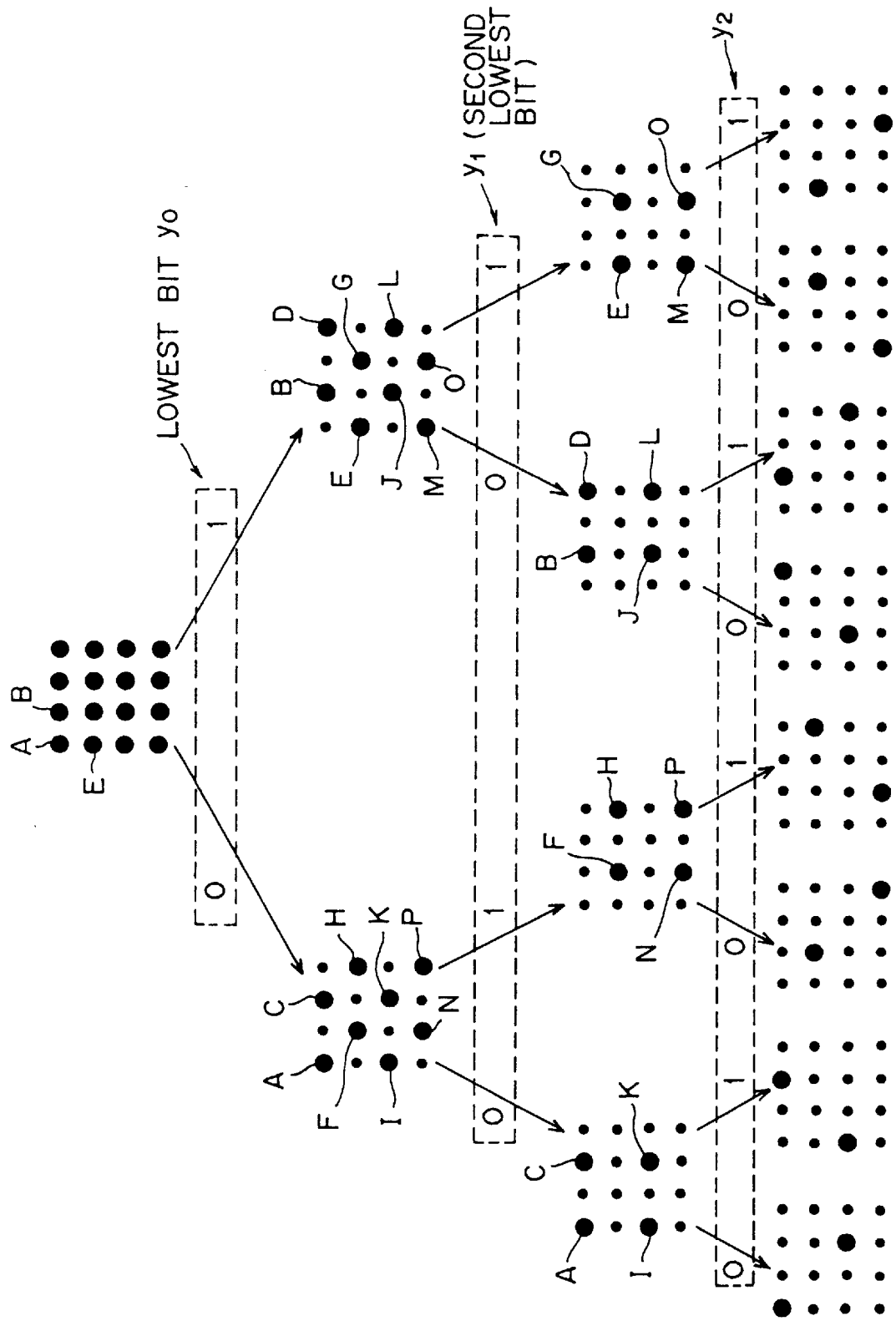
FIG. 7 is a schematic diagram explaining the procedure for assigning 4-bit data to each of signal points of the 16QAM.

FIG. 7 is a schematic diagram explaining the procedure for assigning the 4-bit data (y3, y2, y1, y0) to each of the signal points of the 16QAM.

The lowest bit (corresponding to "y0") of the 4-bit data is used to identify the two signal points, the distance between which is the shortest. That is, if "0" is assigned to the lowest bit of the signal point "A", "1" is assigned to the lowest bit of the signal point whose distance from the signal point "A" is the shortest. Namely, "1" is assigned to the lowest bits of the signal points B and E. If "1" is assigned to the lowest bits of the signal points B and E, "0" is assigned to the lowest bits of the signal points whose distances from these signal points are the shortest. That is, "0" is assigned to the lowest bits of the signal points C, F, and I.

When the lowest bit of the 4-bit data is set at the 16 signal points in a similar manner, "0" is assigned to the lowest bits of the signal points A, C, F, H, I, K, N, and P, and "1" is assigned to the lowest bits of the signal points B, D, E, G, J, L, M, and O, as shown in the second row of FIG. 7.

The second lowest bit (corresponding to "y1") of the 4-bit data is used to identify the two signal points whose distance in between is the shortest in each of groups into which 8 signal points are classified depending on the lowest bit. That is, the second lowest bit is used to identify the two signal points whose distance in between is the second shortest when all the signal points are targeted.

For example, in the second row from the top in FIG. 7, if "0" is assigned to the second lowest bit of the signal point "A", "1" is assigned to the second lowest bit of the signal point whose distance from the signal point "A" is the shortest in the group into which 8 signal points are classified according to the above described procedure (only signal points marked by big black circles are targeted). Namely, "1" is assigned to the second lowest bit of the signal point "F". If "1" is assigned to the second lowest bit of the signal point "F", "0" is assigned to the second lowest bit of the signal whose distance from the signal point "F" is the shortest in the group. Namely, "0" is assigned to the second lowest bit of the signal points C, I, and K.

If the second lowest bit of the 4-bit data is set at the 16 signal points in a similar manner, "0" is assigned to the second lowest bit of the signal points A, C, I, K, B, D, J, and L, while "1" is assigned as the second lowest bit of the signal points F, H, N, P, E, G, M, and 0, as shown in the third row from the top in FIG. 7.

By determining the third and fourth bit values of each signal point in a similar manner, the arrangement shown in FIG. 6A can be obtained.

In FIG. 6A, for example, the signal points whose distances from the signal point "A" are the shortest are "B" and "E". If a comparison is made between the lowest bits of these signals, the lowest bit of the signal point "A" is "0", while the lowest bits of the signal points B and E are "1". Namely, the two signal points whose distance in between can be identified according to the lowest bit (y0) of the 4-bit data.

Additionally, the signal point whose distance from the signal point "A" is the second shortest is the signal point "F". If a comparison is made between the second lowest bits of these signal points, the values of the signal points "A" and "F" are respectively "0" and "1". Namely, the two signal points whose distance in between is the second shortest can be identified according to the second lowest bit (y1) of the 4-bit data.

Similarly, the two signal points whose distance in between is the third shortest or the fourth shortest can be identified according to the third or fourth lowest bit of the 4-bit data.

Provided next is the explanation about the PN sequence generating unit 3 shown in FIG. 4. This unit is composed of a PN sequence selecting unit 16 and a PN sequence storing unit 17. The PN sequence storing unit 17 stores four PN sequences which respectively correspond to four types of 2-bit data "00" through "11", and are different from each other, as shown in FIG. 8. When receiving the lowest two bits (y0, y1) of the 4-bit data output from the convolutional coding unit 1, the PN sequence selecting unit 16 extracts the PN sequence corresponding to this 2-bit data from the PN sequence storing unit 17. Then, the PN sequence selecting unit 16 transmits the extracted PN sequence to the spreading unit 4.

The spreading unit 4 multiplies the output of the mapping unit 2 with the PN sequence output from the PN sequence generating unit 3. Note that the two output lines from the mapping unit 2 respectively indicate an I-phase signal and a Q-phase signal. The spreading unit 4 respectively multiplies the I-phase signal and the Q-phase signal with the PN sequence. The signal spread by being multiplied with the PN sequence is transmitted over a carrier wave.

Figure 9:
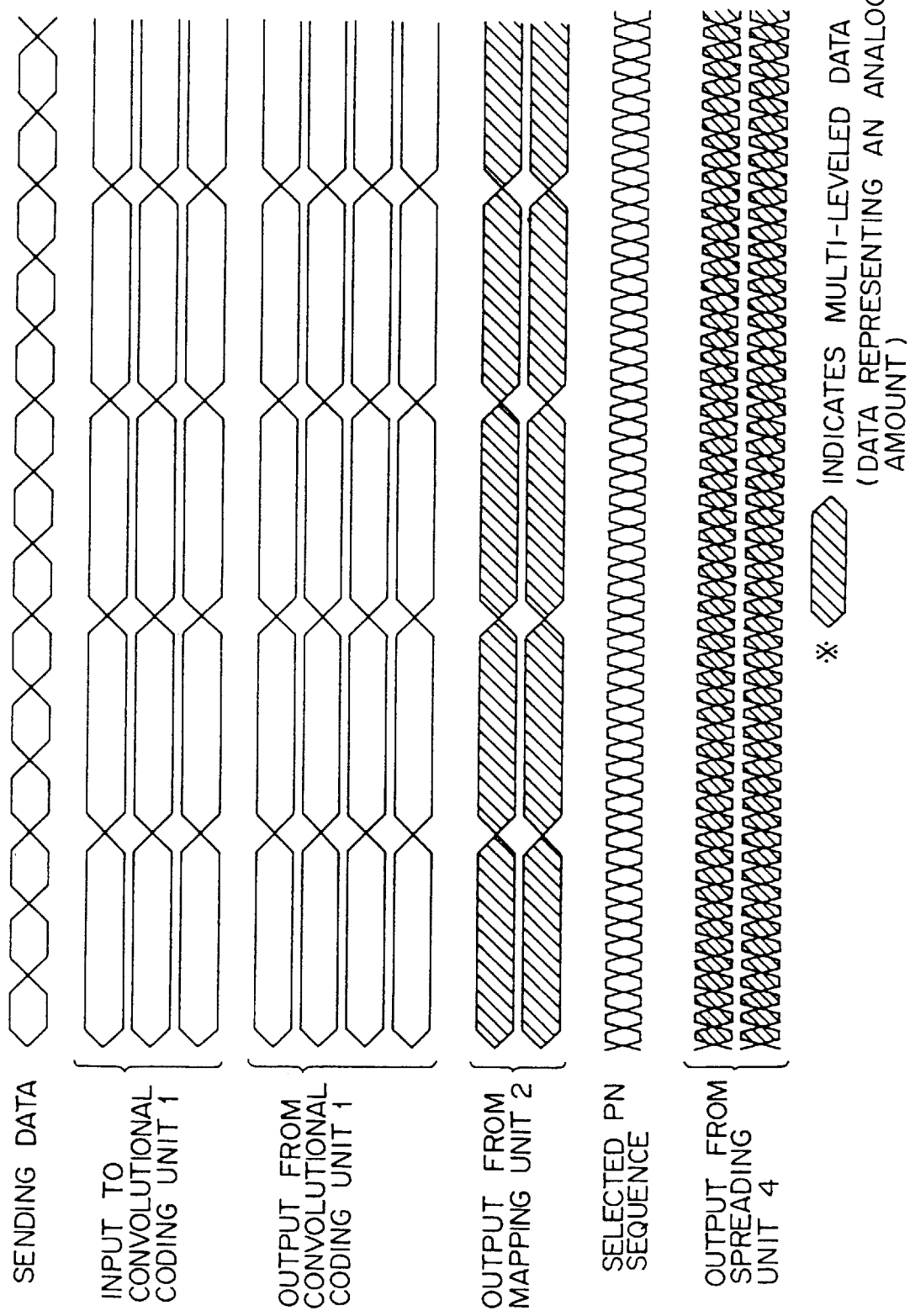
FIG. 9 is a schematic diagram showing the signals of the units on the transmitting side.

FIG. 9 is a schematic diagram showing the signals in the units on the transmitting side. Serially input sending data is converted into 3-bit parallel data by the serial/parallel converting circuit 11, and transmitted to the convolutional coding unit 1. Since the convolutional coding unit 1 adds the redundancy to the sending data, its output will become 4-bit parallel data. Note that these data are binary data (digital data).

The output of the convolutional coding unit 1 is arranged at one of the signal points by the mapping unit 2. That is, the output of the mapping unit 2 is the information indicating the signal points, and is the multi-leveled data which can represent an analog amount. Each of the signal points is represented by a combination of four real numbers and four imaginary numbers on a phase amplitude plane, with the 16QAM shown in FIG. 6A. Therefore, the I-phase and Q-phase components of the output of the mapping unit 2 are four-valued data or four-or more-valued data.

The spreading unit 4 multiplies each output of the mapping unit 2 with the PN sequence selected by the PN sequence selecting unit 16 included in the PN sequence generating unit 3. Accordingly, the output of the spreading unit 4 will become multi-leveled data which is spread. The output of the spreading unit 4 is converted into data for a radio bandwidth. Namely, it is transmitted to the receiving side over a carrier wave.

As described above, according to this embodiment, transmission data is spread using a PN sequence corresponding to part of the value of the data to be transmitted, and transmitted to a receiving side. In the apparatus shown in FIG. 4, the lowest two bits of the sending data are used to obtain the PN sequence.

Figure 10:
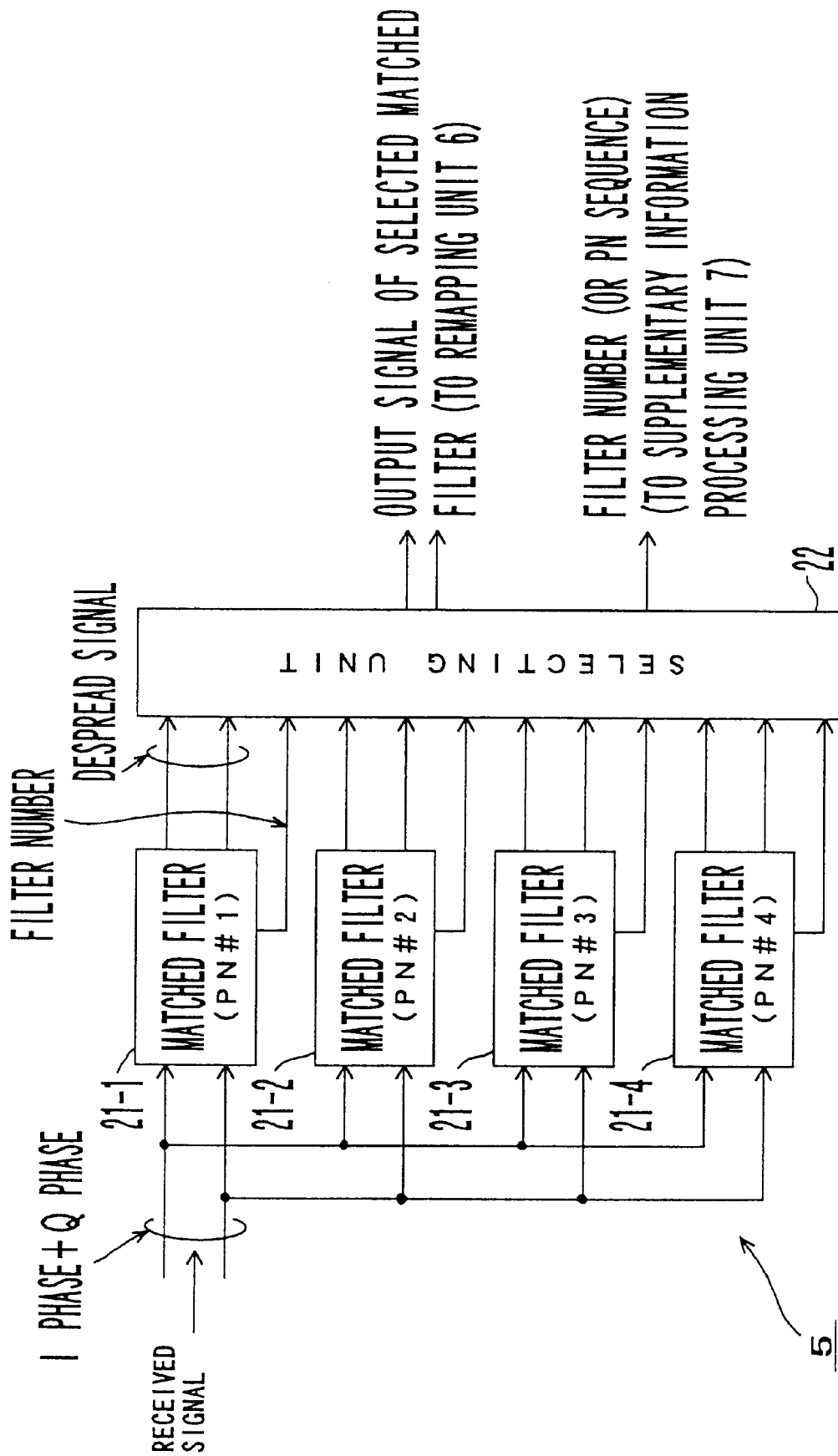
FIG. 10 is a block diagram showing the structure of a despreading unit.

Provided next is the explanation about the configuration on the receiving side. FIG. 10 is a block diagram showing the configuration of the despreading unit 5. When receiving a signal which is spread and transmitted over a carrier wave, the despreading unit 5 multiplies the received signal with the wave whose frequency is the same as that of the carrier wave, and converts the signal into the baseband bandwidth signal. At this time, the I-phase and Q-phase components are extracted by multiplying waves whose phase lags are $\pi/2$.

The signal converted for the base bandwidth is input to matched filters 21-1 through 21-4. The matched filters 21-1 through 21-4 respectively store PN#1 through PN#4 as PN sequences, and multiply the received signal with the PN sequences. That is, the matched filters 21-1 through 21-4 respectively despread the received signal using the PN#1 through PN#4. These PN sequences (PN#1 through PN#4) are the same as the four PN sequences stored in the PN sequence storing unit 17 on the transmitting side. Each of the matched-filters 21-1 through 21-4 performs the despreading process independently for the I-phase and Q-phase components. Additionally, filter numbers (1 through 4) are respectively assigned to the matched filters 21-1 through 21-4 as the numbers for each identifying themselves.

The selecting unit 22 receives each of outputs of the matched filters 21-1 through 21-4, and selects one of the matched filters whose correlation value is the largest among them. The selecting unit 22 transmits the output signal of the selected matched filter to the remapping unit 6, and at the same time, it informs the supplementary information processing unit 7 of the number (filter number) for identifying the selected matched filter. Moreover, the PN sequence used by the matched filter whose correlation value is the largest may be informed from the selecting unit 22 to the supplementary information processing unit 7 instead of the filter number. In this case, the selecting unit 22 recognizes the PN sequence used by each of the matched filters 21-1 through 21-4.

With the above described configuration, the PN sequence used on the transmitting side can be recognized on the receiving side. Assuming that the PN#1 is used as the PN sequence on the transmitting side, the correlation value of the matched filter 21-1 should become the largest among the matched filters 21-1 through 21-4 on the receiving side. If the correlation value of the matched filter 21-1 is detected to be the largest, it can be judged that the signal has been spread using the PN#1 on the transmitting side.

Figure 11:
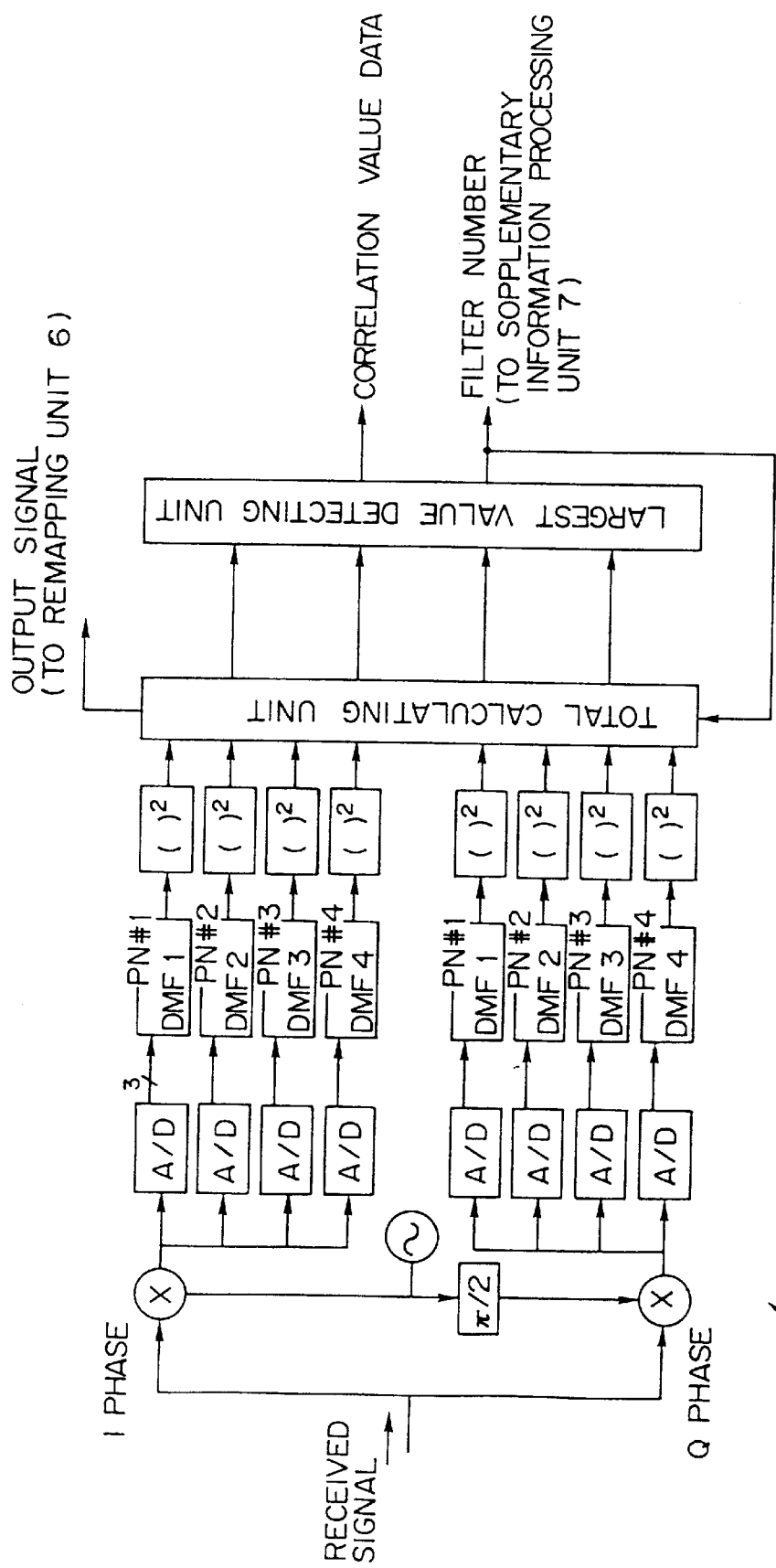
FIG. 11 is a block diagram showing the details of the despreading unit.

FIG. 11 is a block diagram showing the details of the despreading unit 5. As shown in this figure, the received signal which is converted into the signal for the base bandwidth is respectively input to four A/D converters at I and Q phases, and converted into digital signals thereby. The outputs of the respective A/D converters are input to digital matched filters DMFs. The four digital matched filters DMFs respectively arranged for the I and Q phases multiply the outputs of the A/D converters with the PN sequences (PN#1 through PN#4) that the digital matched filters DMFs themselves respectively store.

The outputs of the digital matched filters DMFs are respectively squared. With this process, the correlation values of the respective digital matched filters DMFs are obtained.

A total calculating unit obtains a total of the correlation value data at the I phase and the correlation value data at the Q phase for each of the numbered filter. For example, for the operation of the filter number=1, the total calculating unit obtains the total of the squared value of the output of the digital matched filter DMF1 arranged for the I phase and the squared value of the output of the digital matched filter DMF 1 arranged for the Q phase.

A largest value detecting unit detects the largest value among the correlation value data for each of the numbered filter, which are calculated by the total calculating unit, and informs the supplementary information processing unit 7 of the corresponding filter number. The total calculating unit transmits to the remapping unit 6 the output of the digital matched filter DMF whose correlation value is the largest (the I phase and Q phase data prior to calculating the total) as despread data.

The remapping unit 6 fundamentally performs a process which is the reverse of the process performed by the mapping unit 2 on the transmitting side. That is, the remapping unit 6 receives the output signal of the despreading unit 5, and obtains the corresponding signal point from the I phase and Q phase components. Additionally, the remapping unit 5 holds a correspondence table equivalent to the table shown in FIG. 6B, and outputs the 4-bit data corresponding to the obtained signal point. Assuming that the signal point represented by the I and Q phase components of the received signal is the signal point K, the remapping unit 6 outputs (y3, y2, y1, y0)=(0, 0, 0, 0).

The remapping unit 6 calculates the respective distances between the point on the phase amplitude plan indicated by the received data and the 16 signal points shown in FIG. 6A, and obtains the signal point (4-bit data) corresponding to the received data by detecting the signal point whose calculated distance is the shortest among the distance values. Under a terrestrial channel environment such as an environment in which multipath fading occurs, however, the location of the signal point on the phase amplitude plane, which is indicated by the received data, may vary. Therefore, the correct signal point may sometimes not be obtained. In this case, a digital error occurs. The capability for correcting such a digital error is the Viterbi decoding process. The Viterbi decoding unit 8 will be described later.

When receiving the filter number for identifying one of the matched filters 21-1 through 21-4 from the despreading unit 5, the supplementary information processing unit 7 outputs the 2-bit information corresponding to the filter number to the Viterbi decoding unit 8. Its details are as follows.

The supplementary information processing unit 7 stores 2-bit output information in correspondence with the filter numbers as shown in FIG. 12A. It reads and outputs the 2-bit information corresponding to the received filter number. Assuming that the correlation value of the matched filter 21-1 is the largest in the despreading unit 5, the supplementary information processing unit 7 outputs "00" as the 2-bit information. This is because the supplementary information processing unit 7 receives "1" as the filter number.

Provided here is the explanation about the transmission of the 2-bit information from the transmitting side to the receiving side, according to the above described configuration. First of all, assume that the lowest 2 bits (y0, y1) of the 4-bit data output from the convolutional coding unit 1 are "0, 0" on the transmitting side. In this case, the PN#1 is selected as the PN sequence according to the table shown in FIG. 8, and the signal is spread using the selected PN#1. When the signal is spread using the PN#1 on the transmitting side, the correlation value when the signal is despread using the PN#1 becomes the largest on the receiving side. That is, the correlation value of the matched filter 21-1 becomes the largest. As a result, the supplementary information processing unit 7 receives "1" as the filter number, and outputs "00" as the 2-bit information. This 2-bit information is equivalent to the lowest 2 bits of the 4-bit data to be transmitted. As described above, the 2-bit data "00" is transmitted from the transmitting side to the receiving side by using the PN sequence with the above described configuration.

A filter number is informed from the despreading unit 5 to the supplementary information processing unit 7 in the above described example. However, if a PN sequence is informed instead of the filter number, the supplementary information processing unit 7 must store the correspondence as shown in FIG. 12B.

Figure 13:
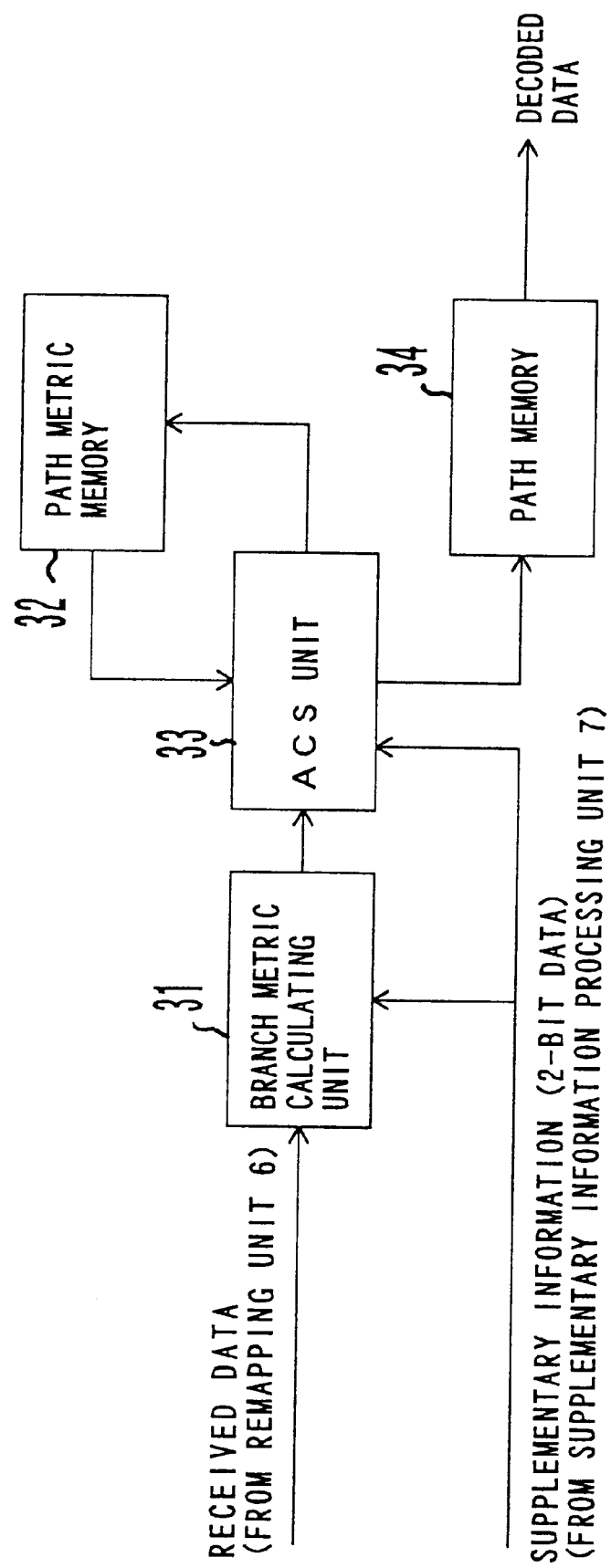
FIG. 13 is a block diagram showing the structure of a Viterbi decoding unit.

FIG. 13 is a block diagram showing the configuration of the Viterbi decoding unit 8. The Viterbi decoding unit 8 is a circuit for detecting the maximum likelihood data from received data which is error-correction-coded, and regenerating the transmission data.

A branch metric calculating unit 31 receives 4-bit data from the remapping unit 6, and supplementary information (2-bit data) from the supplementary information processing unit 7. Then, it calculates the distances between the point on the phase amplitude plane, which is indicated by the received 4-bit data, and the 16 signal points shown in FIG. 6A. Note that, however, the branch metric calculating unit 31 calculates the distances not from all of the 16 signal points, but the distances from the signal points designated by the supplementary information (2-bit data) only.

Assume that the supplementary information (2-bit data) is "00". Here, the 2-bit data received as the supplementary information is, as described above, the lowest 2 bits (y0, y1) of the 4-bit data output from the convolutional coding unit 1. Accordingly, if the supplementary information is "00", its 4-bit data should be transmitted using the signal points whose lowest 2 bits are "00" among the 16 signal points shown in FIG. 6A. That is, the above described 4-bit data should be transmitted by being arranged at any of the signal points A, C, I, and K. Accordingly, if the supplementary information is "00", the branch metric calculating unit 31 calculates the respective distances between the signal point indicated by the 4-bit data received from the remapping unit 6 and the signal points A, C, I, and K.

A path metric memory 32 stores a path calculated and selected by an ACS (Add, Compare, and Select) unit 33 and corresponding path metric data (path length data).

The ACS unit 33 obtains the total of the path metric data extracted from the path metric memory 32 (that is, the path metric data obtained by the previous calculation) and each of the distances from the signal points, which are calculated by the branch metric calculating unit 31. Furthermore, the ACS unit 33 holds the path metric data, which is obtained beforehand, of paths which can occur in a certain state. The ACS unit 33 obtains a Euclidean distance or a Hamming distance by making a comparison between each total data and the path metric data obtained beforehand. The path whose Euclidean distance or Hamming distance is the shortest is defined as the maximum likelihood (the most probable) path. This comparison process is explained next by referring to FIGS. 14A and 14B.

Figure 14A:
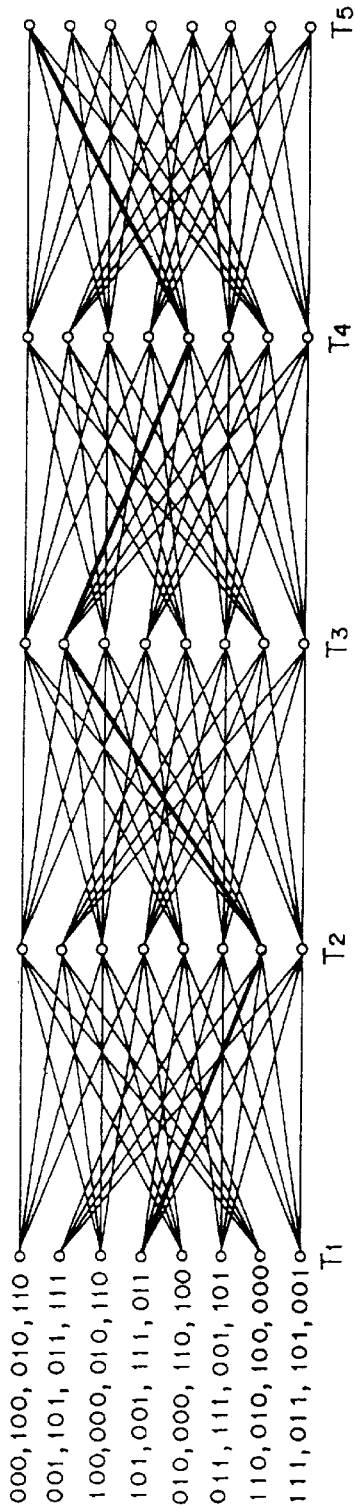
FIG. 14A is a diagram explaining state transitions and paths in a conventional system.
Figure 14B:
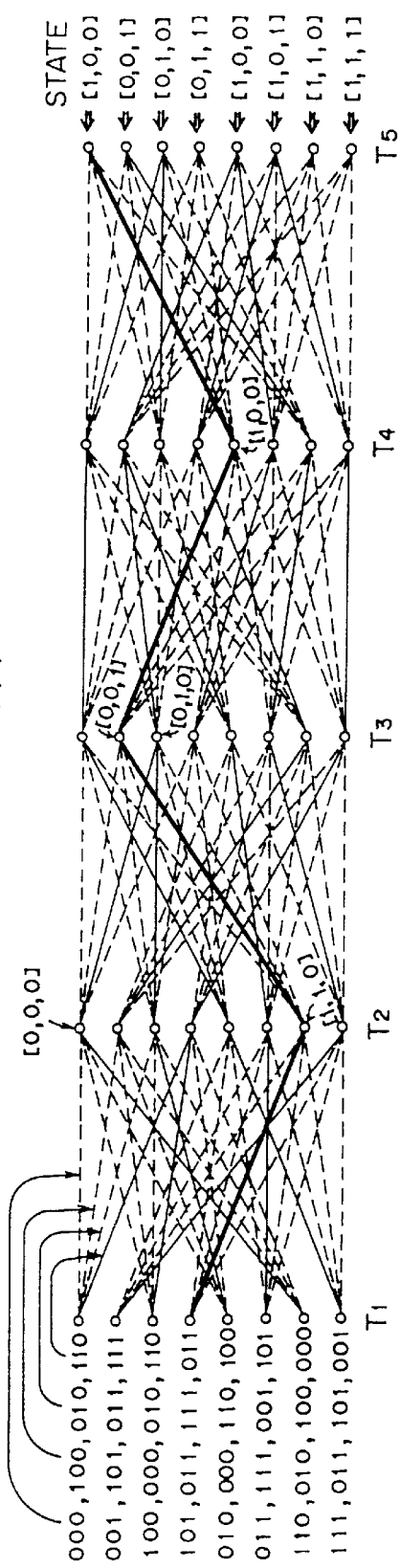
FIG. 14B is a diagram explaining state transitions and paths in a system according to this embodiment.

FIG. 14A is a state diagram according to a conventional system, while FIG. 14B is a state diagram according to this embodiment. Here, how to look at these figures is explained. In FIGS. 14A and 14B, eight small circles appearing in the vertical direction respectively represent one state. Specifically, they correspond to the states of the registers 12-0 through 12-2 shown in FIG. 4. They respectively correspond to "000", "001", "010", . . . "111" from the top. For example, the topmost state indicates that each of the registers 12-0, 12-1, and 12-2 hold "0". The state transitions are represented as a trellis diagram explained by referring to FIG. 5.

In FIGS. 14A and 14B, four 3-digit numerals written for each of the states correspond to the lowest 3 bits (y0, y1, y2) of 4-bit data to be transmitted. In each 3-digit numeral, the leftmost bit corresponds to "y0", the middle bit corresponds to "y1", and the rightmost bit corresponds to "y2". Note that each 3-digit numeral designates a path when one state changes to another. Four 3-digit numerals are arranged in the horizontal direction for each of the states. The leftmost 3-digit numeral among them designates the topmost path among four output paths. Similarly, the second, third, and fourth 3-digit numerals written from the left respectively designate the second, third, and fourth paths from the top among the four output paths.

Assume that the state of the registers 12-0 through 12-2 are "000". If the lowest 3 bits of the 4-bit data are (y0, y1, y2)=(0, 1, 0) in this case, the state of the registers at a time T3 makes a transition to "010". The paths represented by thick solid lines in FIGS. 14A and 14B indicate the transition that the lowest 3 bits (y0, y1, y2) of the 4 bit data occur in the order of (111, 010, 001, 010) between the times T1 and T5.

Provided below is the explanation about the operations performed by the ACS unit 33 at the time T3. At the time T3, the path metric memory 32 stores the path metric data of the path leading to the state at the time T3. Here, assume that the path represented by the thick solid line is selected as the maximum likelihood path with the process performed at the time T2. The ACS unit 33 reads the path metric data of this path from the path metric memory 32. Furthermore, the ACS unit 33 receives the distance data between the signal point indicated by the received 4-bit data and each of the signal points of the 16QAM. Since the branch metric calculating unit 31 calculates only the distances from the signal points designated by the supplementary information (2-bit data) as described above, the ACS unit 33 receives the distance data relating to four signal points.

Next, the ACS unit 33 adds the distance data from each of the signal points to the path metric data read from the path metric memory 32. Then, the ACS unit 33 makes a comparison between the path metric data of one or more paths which can occur in the state transition from the time T3 to the time T4 and the data obtained by the above described addition operation, and selects the path whose Euclidean distance is the shortest.

As shown in FIGS. 14A and 14B, the number of paths via which one state makes a transition to another is respectively 4. For example, four paths designated by (y0, y1, y2)=(001), (101), (011), (111) can occur in the state "0, 0, 1" at the time T3.

The ACS unit 33, however, does not regard all of the four paths as comparison targets. It regards only the path designated by the supplementary information informed by the supplementary information processing unit 7 as the comparison target. For example, upon receipt of "00" as the supplementary information when the state of the registers 12-0 through 12-2 is "0,0,1" at the time T3, the ACS unit 33 determines that the values of the lowest 2 bits of the 4-bit data are (y0, y1)=(0, 0), and selects the path designated by the numeral whose leftmost 2 bits are "0" among the four 3-digit numerals written for each of the states on the left hand side of FIGS. 14A and 14B. Namely, the path designated by (y0, y1, y2)=(0, 0, 1), that is, the path from the state at the time T3 "0, 0, 1" to the state at the time T4 "1, 0, 0" is selected as the comparison target in this case.

Then, the ACS unit 33 makes a comparison between the path metric data of the path to be compared and the above described four addition operation data, and obtains the respective Euclidean distances. A path that has the shortest Euclidean distance among them is regarded as the maximum likelihood path. The path thus obtained is written to the path memory 34, and the path metric data of that path is written to the path metric memory 32.

The output of the path memory 34 is the result of decoding. That is, in the convolutional coding process, the relation between one piece of data and one path is uniquely determined according to a coding process. Therefore, if a path is obtained, the decoded data which is uniquely determined by that path can be obtained. This procedure is the same as that of a typical Viterbi decoding process.

With the conventional Viterbi decoding process, the maximum likelihood path is detected by regarding all paths which can occur as comparison targets as shown in FIG. 14A. In the meantime, according to this embodiment, only the path designated by the supplementary information is regarded as a comparison target. That is, the paths indicated by the dashed lines in FIG. 14B are not regarded as comparison targets. Accordingly, the process time can be significantly improved.

FIG. 15 is a flowchart showing the operations performed by the Viterbi decoding unit 8. In step S1, 4-bit data is received from the remapping unit 6. In step S2, the supplementary information is received from the supplementary information processing unit 7. In step S3, one signal point is extracted from the 16 signal points of the 16QAM. In step S4, the supplementary information is referenced, and it is determined whether or not the signal point extracted in step S3 is a signal point whose distance must be calculated.

If "YES", the distance between the signal point indicated by the 4-bit data received in step S1 and the signal point extracted in step S3 is calculated in step S5. In step S6, it is determined whether or not the above described process is performed for all of the signal points. If a signal point yet to be processed is left, the process goes back to step S3. If the signal point is not determined to be the signal point whose distance must be calculated, "NO" in step S4, the process goes to step S6 without performing step S5.

With the above described process performed in steps S3 through S6, the distance data from one or more signal points (four points in the embodiment) can be obtained.

In step S7, the path metric data of the path until the current time point is read from the path metric memory, and the distance data calculated in step S5 is added to the path metric data. With this process, one or more pieces (four pieces in the embodiment) of the path metric data can be obtained.

In step S8, one of paths which can occur when one state makes a transition to another, is extracted. In this embodiment, the number of paths which can occur in one state is 4, and one of them is selected. In step S9, the supplementary information received in step S2 is referenced, and it is determined whether or not the path extracted in step S8 is a comparison target path. In the example shown in FIG. 14B, the paths to be compared are indicated by solid lines, while the paths not to be compared are indicated by dashed lines.

The process performed in step S10 is a process performed in a normal Viterbi decoding process. In this step, each added distance data calculated in step S7 is compared with the path metric data of the path extracted in step S8, and a Euclidean distance (Hamming distance for the convolutional coding) is obtained. Then, the path whose distance is the shortest is selected. If the extracted path is not determined to be a comparison target, "NO" in step S9, the process in step S10 is not performed. In step S11, it is determined whether or not the above described process is performed for all of paths which can occur. If a path yet to be processed is left, "NO" in step S11, the process goes back to step S8.

In step S12, the maximum likelihood path is determined. If step S10 is performed a plural number of times in the loop process performed in steps S8 through S11, the path whose Euclidean distance is the shortest is selected among them. Then, this path is written to the path memory, and at the same time, the path metric data is written to the path metric memory.

In step S13, the decoded data is obtained from the maximum likelihood path. The procedure for obtaining the decoded data from the maximum likelihood path is the reverse of the procedure for coding data. The original sending data can be obtained according to the relation shown in FIG. 5.

Since the distances from only the signal points designated by supplementary information are obtained with the Viterbi decoding process according to this embodiment, the number of times that step S5 of the above described flowchart is performed, can be reduced. As a result, also the numbers of times that the addition process performed in step S7 and the comparison process performed in step S10 are reduced. Furthermore, because the Euclidean distance is obtained only for the paths designated by the supplementary information, the number of times that step S10 is performed is further reduced.

Provided next is the explanation about the improvement of an error rate according to this embodiment. Here, the explanation is provided by assuming that the 4-bit data (y3, y2, y1, y0)=(1, 0, 0, 0) is arranged at a signal point "A" and transmitted.

Figure 16:
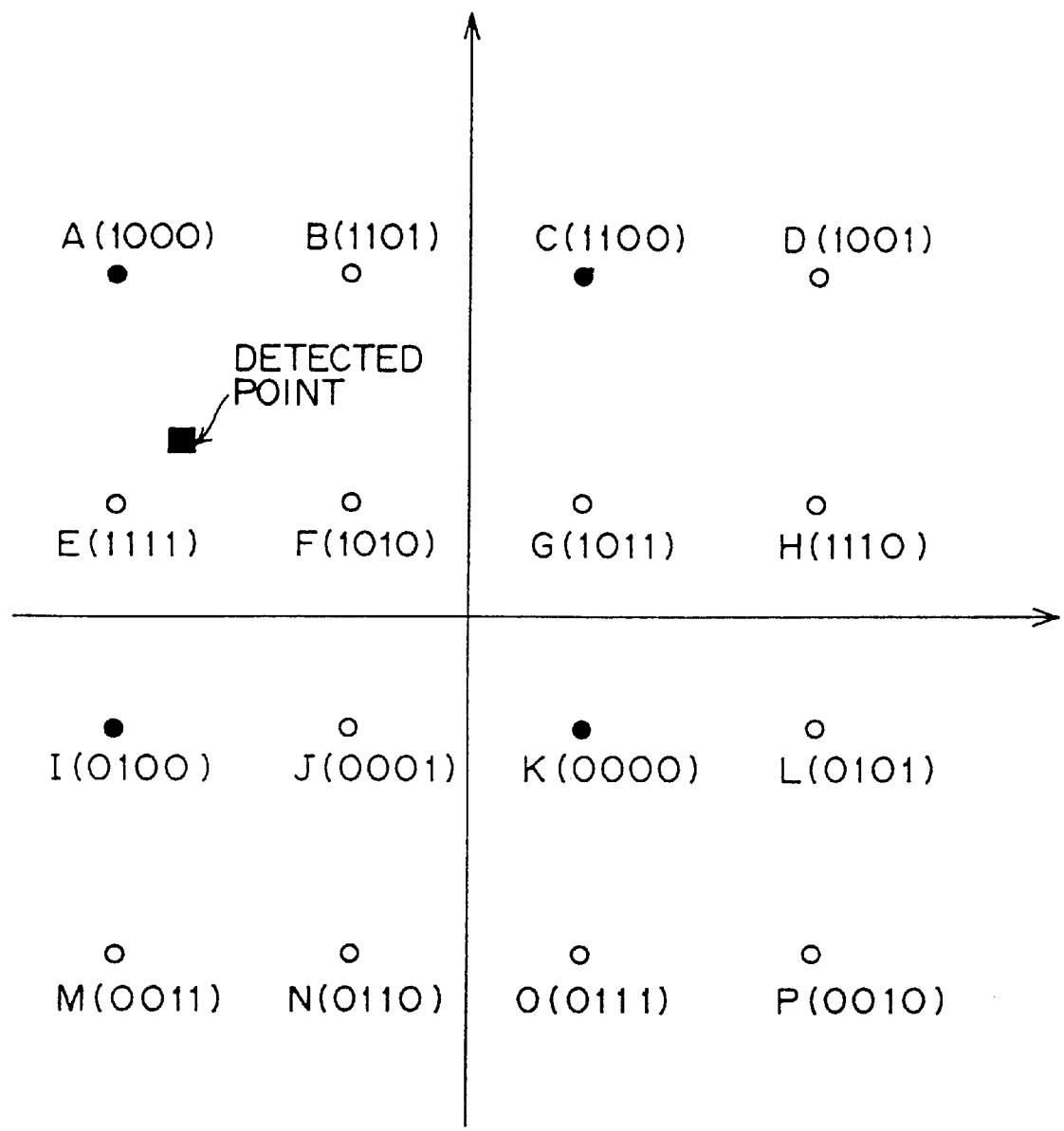
FIG. 16 is a schematic diagram explaining an effect that an error rate is improved.

Ideally, the data arranged at the signal point "A" and transmitted on a transmitting side are detected at the signal point "A", also on a receiving side. However, in a terrestrial channel environment, a transmission signal point varies, and the transmission data may be detected at a location different from the signal point A. Here, the transmission data is assumed to be detected at the location marked by ■ shown in FIG. 16. Here, the detected point is the nearest to the signal point E.

With the conventional system, it may be determined that the transmission data has arranged at the signal point "E". Accordingly, the transmission data may be determined to be (1, 1, 1, 1) on the receiving side.

With the system according to this embodiment, however, the PN sequence used on the transmitting side is detected on the receiving side, so that the lowest 2 bits (y1, y0) of the 4-bit data can be recognized to be (0,0). Therefore, the transmission data is estimated to be arranged at any of the signal points A, C, I, and K, and transmitted. Consequently, it is determined that the transmission data is arranged at the signal point nearest to the mark ■, that is, the signal point "A", and transmitted. Therefore, even if the transmission data is detected at the location marked by ■, it can be determined that the transmission data is (1, 0, 0, 0).

Normally, as the distance between signal points increases, the error rate is reduced. With the system according to the present invention, only particular points become substantial signal points according to the supplementary information transmitted using a PN sequence on a receiving side. Therefore, the distance between signal points is virtually increased, thereby reducing digital errors. For example, if the distance between signal points is shorter than the distance in the white Gaussian noise environment, 3 to 5 dB can be obtained as an improvement value to the S/N ratio, to attain an error rate of $10^{-5}$.

As described above, with the spread spectrum communication system according to the present invention, when data is arranged at a predetermined signal point and transmitted, a signal is spread by using a PN sequence corresponding to part of the data, and the part of the transmission data is recognized by detecting the used PN sequence on the receiving side, thereby improving an error rate when the data is regenerated from the signal point of the received signal. Furthermore, since the part of the transmission data to be regenerated is known in the error correcting code process, the decoding process is simplified.

In the above embodiment, a system introducing a Direct Sequence method is explained. However, this present invention can be applied to other spectrum spread methods. For example, this invention can be applied to a system introducing a Frequency Hopping method.

What is claimed is:

1. A spread spectrum communication system for transmitting N-bit data by arranging the N-bit data at any of $2^N$ signal points, comprising:

error correcting code means for performing an error correcting code process for M-bit (M≦N) sending data to generate N-bit transmission data;

spread sequence storing means for storing a plurality of spread sequences;

extracting means for extracting a spread sequence from said spread sequence storing means based on at least part of the N-bit transmission data;

mapping means for arranging the N-bit transmission data at one of the $2^N$ signal points corresponding to contents of the N-bit transmission data;

spreading means for spreading an output of said mapping means using the spread sequence extracted by said extracting means;

spread sequence detecting means for detecting the spread sequence used by said spreading means;

remapping means for performing a despreading process for a received signal using the spread sequence detected by said spread sequence detecting means, and generating N-bit data based on a despread result;

supplementary information processing means for obtaining the at least part of the N-bit transmission data based on the spread sequence detected by said spread sequence detecting means; and error correcting decode means for performing an error correcting decode process based on the N-bit data generated by said remapping means and the at least part of the N-bit transmission data obtained by said supplementary information processing means, and regenerating the M-bit sending data.

2. The spread spectrum communication system according to claim 1, wherein:

said spread sequence detecting means respectively multiplies the received signal with the plurality of spread sequences stored by said spread sequence storing means, and detects the spread sequence used by said spreading means by examining a spread sequence whose correlation is highest among the plurality of spread sequences by which the received signal is multiplied.

3. The spread spectrum communication system according to claim 1, wherein:

when each of the $2^N$ signal points is corresponded to the N-bit data, two signal points whose distance in between is the shortest are identified by using a first bit of the N-bit data, and two signal points whose distance in between is a second, third, . . . Nth shortest are identified by using a second, third, . . . , Nth bit of the N-bit data; and when one or more bits for extracting the spread sequence from the N-bit transmission data is determined, a predetermined number of bits is sequentially selected from the first bit.

4. The spread spectrum communication system according to claim 1, wherein:

when each of the $2^N$ signal points is corresponded to the N-bit data, two signal points whose distance in between is the shortest are identified by using a first bit of the N-bit data; and the first bit is included in the at least the part of the N-bit transmission data for extracting a spread sequence.

5. A spread spectrum communication system for transmitting data in multiple bits, comprising:

spread sequence generating means for generating a spread sequence based on at least part of sending data;

spreading means for spreading the sending data using the spread sequence generated by said spread sequence generating means;

spread sequence detecting means for detecting the spread sequence used by said spreading means;

supplementary information processing means for obtaining the at least part of the sending data based on the spread sequence detected by said spread sequence detecting means; and regenerating means for regenerating the sending data based on the data obtained with a despreading process using the spread sequence detected by said spread sequence detecting means and the at least part of the sending data obtained by said supplementary information processing means.

6. A spread spectrum communication system for transmitting data comprising a first data segment and a second data segment, the system comprising:

spread sequence generating means for generating a spread sequence based on the first data segment;

spreading means for spreading at least the second data segment using the spread sequence generated by said spread sequence generating means;

detecting means for detecting the spread sequence used by said spreading means;

calculating means for obtaining the first data segment according to the spread sequence detected by said detecting means; and despreading means for obtaining the second data segment by spreading the output of said spreading means using the spread sequence detected by said detecting means, wherein said spread sequence generating means and said spreading means are provided on a transmitting side of the system, and said detecting means, said calculating means and said despreading means are provided on a receiving side of the system.

7. A spread spectrum transmitter used in a communication system for transmitting N-bit data by arranging the N-bit data at any of $2^N$ signal points, comprising:

error correcting code means for performing an error correcting code process for M-bit (M≦N) sending data to generate N-bit transmission data;

spread sequence storing means for storing a plurality of spread sequences;

extracting means for extracting a spread sequence from said spread sequence storing means based on at least part of the N-bit transmission data;

mapping means for arranging the N-bit transmission data at one of the $2^N$ signal points corresponding to contents of the N-bit transmission data; and spreading means for spreading an output of said mapping means using the spread sequence extracted by said extracting means.

8. A spread spectrum receiver for use in a communication system where a transmitter generates N-bit transmission data by performing an error correcting code process for M-bit (M≦N) sending data, and transmits the N-bit transmission data by arranging the N-bit transmitting data at any of the $2^N$ signal points, comprising:

spread sequence detecting means for detecting a spread sequence used by the transmitter;

remapping means for performing a spreading process for a received signal by using the spread sequence detected by said spread sequence detecting means, and generating N-bit data based on a spread result;

supplementary information processing means for obtaining at least part of the N-bit transmission data based on the spread sequence detected by said spread sequence detecting means; and error correcting decode means for performing an error correcting decode process based on the N-bit data generated by said remapping means and the at least part of the N-bit transmission data obtained by said supplementary information processing means, and regenerating the M-bit sending data.

* * * * *